12) United States Patent
Ulibarri

(10) Patent No.: US 7,602,296 B2
(45) Date of Patent: Oct. 13, 2009

(54) SYSTEM AND METHOD FOR TRANSPORT SECURITY CONTROL AND TRACKING

(76) Inventor: Giovanni M. Ulibarri, 302 Stiles St., Midlothian, TX (US) 76065

( * ) Notice: Subject to any disclaimer, the term of this patent is extended or adjusted under 35 U.S.C. 154(b) by 303 days.

(21) Appl. No.: 11/810,334

(22) Filed: Jun. 4, 2007

(65) Prior Publication Data

US 2008/0042842 A1    Feb. 21, 2008

Related U.S. Application Data

(60) Provisional application No. 60/810,731, filed on Jun. 2, 2006.

(51) Int. Cl.
*G08B 13/14* (2006.01)
(52) U.S. Cl. .................................. 340/572.1
(58) Field of Classification Search ... 340/572.1–572.9, 340/539.22, 10.1, 825.49, 431, 426.19; 235/385, 235/462.11
See application file for complete search history.

(56) References Cited

U.S. PATENT DOCUMENTS

| 6,814,287 | B1 | 11/2004 | Chang et al. |
| 6,825,766 | B2 | 11/2004 | Hewitt et al. |
| 6,901,034 | B2 | 5/2005 | Nanba |
| 6,988,079 | B1* | 1/2006 | Or-Bach et al. ............... 705/28 |
| 7,002,472 | B2 | 2/2006 | Stratmoen et al. |
| 7,005,985 | B1 | 2/2006 | Steeves |
| 7,019,640 | B2 | 3/2006 | Canich et al. |
| 7,034,683 | B2 | 4/2006 | Ghazarian |
| 7,036,729 | B2 | 5/2006 | Chung |
| 7,053,777 | B2 | 5/2006 | Allen |
| 7,498,938 | B2* | 3/2009 | Ulrich ..................... 340/539.13 |
| 2004/0233055 | A1* | 11/2004 | Canich et al. ........... 340/539.26 |
| 2005/0024200 | A1* | 2/2005 | Lambright et al. ........ 340/539.1 |
| 2005/0046567 | A1* | 3/2005 | Mortenson et al. ...... 340/539.13 |
| 2006/0071072 | A1* | 4/2006 | McDonald ................... 235/385 |
| 2006/0071786 | A1* | 4/2006 | Fano ..................... 340/539.22 |
| 2006/0111868 | A1 | 5/2006 | Beshears et al. |

FOREIGN PATENT DOCUMENTS

| WO | WO 01/55931 A1 | 8/2001 |
| WO | WO 2005/008554 A1 | 1/2005 |
| WO | WO 2005/057331 A2 | 6/2005 |
| WO | WO 2006/019418 A2 | 2/2006 |
| WO | WO 2006/019753 A1 | 2/2006 |
| WO | WO 2006/053566 A1 | 5/2006 |

* cited by examiner

*Primary Examiner*—Phung Nguyen
(74) *Attorney, Agent, or Firm*—Schultz & Assoc.

(57) ABSTRACT

The invention disclosed provides an apparatus and method to monitor and track the security of bulk cargo from a dispatch point to a receipt point. The apparatus includes a plurality of RFID antennas at a dispatch location and at a receipt location, networked software modules in communication with the RFID antennas, and disposable RFID tags used as security seals affixed to a carrier at multiple locations. The software modules include a Cargo Registration Module, a Dispatch Scanning Module, and a Receipt Scanning Module. The apparatus and method reduce cargo inspection time and labor at the points of departure and receipt. The automation of the dispatch and receipt process eliminates the human element thereby increasing the efficiency of the process. An additional embodiment includes a "single-use" disposable RFID tagged seal adapted to be attached to a transport portal unable to be removed without damaging an RFID transmitter contained within.

30 Claims, 11 Drawing Sheets

TRANSPORT SECURITY DISPATCH

| | BIN 4 CARGO | BIN 3 CARGO | BIN 2 CARGO | BIN 1 CARGO | OPERATOR | VEHICLE |
|---|---|---|---|---|---|---|
| | CC100 | CC100 | CC100 | CC100 | 14 | 2 |
| | 873 | 980 | 645 | 654 | | |
| | BIN 4 TAG | BIN 3 TAG | BIN 2 TAG | BIN 1 TAG | | |

| | DispatchDate | OriganalID | VehicleID | OperatorID | Bin1CargoCode | Bin1TagID | Bin2CargoCode | Bin2TagID | Bin3CargoCode | Bin3TagID | Bin4CargoCode |
|---|---|---|---|---|---|---|---|---|---|---|---|
| 1 | 4/19/2006 2:51:00 PM | Plant 1 | 1 | 11 | CC200 | 135 | CC100 | 136 | CC100 | 138 | CC100 |
| 2 | 5/2/2006 1:16:00 PM | Plant 3 | 3 | 13 | CC300 | 335 | CC100 | 422 | CC300 | 254 | CC400 |
| 3 | 5/2/2006 1:17:00 PM | Plant 4 | 2 | 12 | CC300 | 677 | CC100 | 566 | CC300 | 877 | CC300 |
| 4 | 5/2/2006 1:18:00 PM | Plant 5 | 1 | 14 | CC100 | 654 | CC100 | 645 | CC100 | 930 | CC100 |

| | | |
|---|---|---|
| Plant 5 | Plant 1 | Smith |
| POINT OF ORIGIN | DESTINATION | INSPECTOR |
| 5/2/2006 1:10:00 PM | | Jones |
| DISPATCH DATE | | DISPATCHER |
| | | DISPATCH |

[ New ] [ Edit ] [ Save ] [ Cancel ] [ Delete ]

*FIG. 3*

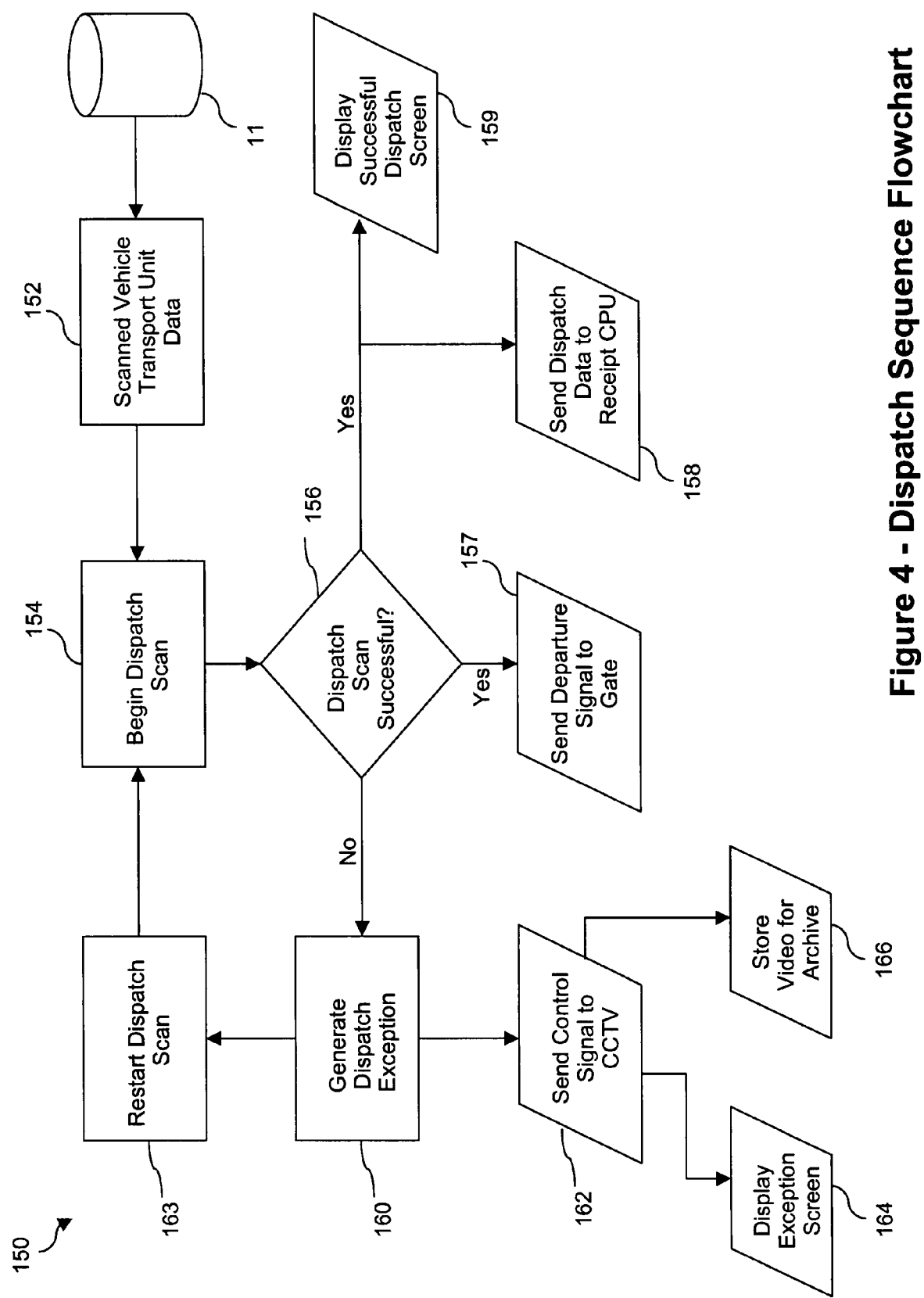
Figure 4 - Dispatch Sequence Flowchart

Figure 7 - Receipt Sequence Flowchart

SYSTEM AND METHOD FOR TRANSPORT SECURITY CONTROL AND TRACKING

CROSS REFERENCE TO RELATED APPLICATIONS

The present application claims priority to Provisional Application Ser. No. 60/810,731, entitled "Special Transport Security Control and Tracking", to Ulibarri, filed on Jun. 2, 2006.

FIELD OF THE INVENTION

This invention relates to an apparatus and method for the control and tracking of security for bulk cargo. In particular, this invention relates to an apparatus and method that uses disposable radio frequency identification tags as seals and a plurality of software modules to monitor and track the security of bulk cargo from a dispatch point to a receipt point in order to reduce the time required to dispatch and receive shipments.

BACKGROUND OF THE INVENTION

Bulk cargo is generally cargo that is unpacked and of a homogenous nature. These cargos are typically blown, poured or dropped as a liquid or a solid into a bulk carrier's hold such as a railroad car, ship hull, or a tanker truck/trailer body. Some examples of bulk cargo include coal, grain, chemicals, dry or liquid edibles, oil, or gas.

Before a shipment of bulk cargo can be dispatched to its destination, the originating facility or shipping company is responsible for inspecting the cargo and the carrier and insuring they are loaded properly. A visual inspection is conducted to verify that the load is present and unadulterated. Further inspection is conducted to assume that the load is secure and that the cargo carrier is seaworthy or roadworthy and is sealed. Bills of lading are checked and destinations recorded.

Often a bulk cargo tanker truck has multiple separated bins for carrying payload. Each bin is marked by an identifying number or series of numbers. The inspector must document the identifying numbers for each bin in addition to the carrier identification and the driver identification and finally check these numbers against the manifest to insure correctness. If all checks out properly, the carrier is dispatched. Once the shipment reaches its destination a receiving inspector must repeat the process. This inspection process is time consuming and labor intensive. Because of the time consuming meticulous nature of the task, errors occur causing further delays and in some cases the inspection may be skipped completely.

Further, there exists the possibility of the cargo being unknowingly compromised. The lock or seal on a particular bin may be broken during shipment and the cargo inside either partially reduced, contaminated, or spoiled. The receiving inspector may or may not notice the breach. Once the unsatisfactory cargo is discovered, responsibility for the loss depends on shipping and inspection documentation. Locating various inspectors for personal testimony and sorting through the paper trail of inspections are time consuming tasks and present unwanted delays.

The prior art includes examples of systems using RFID tags to track shipping vehicles and packages and to automate inventory and dispatch procedures. However, none of the prior art uses disposable RFID tags and a system of networked software modules to track and monitor the integrity of bulk cargo to increase security and the efficiency of the inspection process.

U.S. Pat. No. 7,034,683 to Ghazarian discloses a system for vehicle, pallet and personnel tracking including RFID transponders, gate readers and GPS GSM modems. The system allows a vehicle to "electronically" log product content, driver, passengers and so forth into an onboard vehicle CPU. Ghazarian requires an RFID transponder be affixed to each shipped item of concern and therefore does not accommodate the bulk cargo shipping industry. The system incurs extra expense by requiring each carrier vehicle to have on board its own RFID tag reader and an RFID transceiver CPU. Ghazarian does not disclose use of video monitoring equipment, or the use of multiple disposable RFID tags as "seals" at various locations on a truck trailer.

U.S. Pat. No. 7,053,777 to Allen discloses a system for tracking products in a distribution path by using an RFID tag mountable on the product or the product carrier. This system discloses a plurality of interrogators along the distribution path that provide feedback about the location of the RFID tag and its product. A memory is associated with the RFID tag that includes information about the product in transit. Location data is communicated to a central database from various base stations or interrogators via the internet. Allen does not disclose the use of video to discover security violations or the use of multiple disposable RFID tags as security seals to ensure the integrity of the shipment.

World Patent Pub. No. 053566A1 to Braun discloses a system for monitoring a container door during transport. The system includes an onboard device attached to the container door and in communication with a central computer system. The central computer system processes alerts transmitted by the onboard device and tracks the position of the onboard device. The onboard device includes a complicated rechargeable battery powered processor/sensor component and an antenna component including a GPS antenna/receiver. The processor/sensor can sense container conditions such as door opening/closing, light, temperature, humidity, and vibration/motion. Braun does disclose recording events such as the opening and the closing a door of the container during transport. However, Braun is not suited to the bulk cargo industry, does not address the time consuming process of dispatch and receipt inspections, and does not disclose the use of multiple disposable RFID tags as seals.

U.S. Patent Application Pub. No. 2006/0011721 to Olsen, III, et al. discloses a system used to automate inventory and dispatch procedures by detecting arrivals and departures of delivery vehicles and container devices in a staging area. In one embodiment, the truck and the trailer are each fitted with a permanent RFID tag. Each RFID tag includes unique identification information stored in an information management system. Alerts are issued when the truck pulling the trailer arrives at a location. Upon departure an alert is issued if a truck and trailer have inconsistent destinations. In another embodiment, the system uses GPS tracking to trigger when the truck and trailer are within a certain distance of the reader system. Olsen does not disclose using multiple disposable RFID tags as security seals to monitor cargo integrity. Olsen also does not disclose a software system to monitor and coordinate cargo integrity.

SUMMARY OF INVENTION

The invention provides an apparatus and method for monitoring and tracking the integrity of bulk cargo from a dispatch point to a receipt point by providing multiple radio frequency identification (RFID) tags used as security seals affixed to various locations on a carrier vehicle and separate software modules each running on computers connected to each other via the internet or other wide area network. The software modules include a cargo registration module (CRM), a dispatch scanning module (DSM), and a cargo receipt scanning module (RSM). The invention further comprises RFID interrogation hardware to scan the carrier vehicles and trailers and read the RFID seals. The apparatus and method reduce cargo inspection time and labor at the bulk cargo carrier's point of departure and at the point of receipt.

In another preferred embodiment, each vehicle is equipped with a GPS transponder. A fourth software module, a GPS transit tracking module (GTTM), may display positional and carrier ID information, gross weight, average speed, and estimated time of arrival.

In another preferred embodiment, the DSM and the RSM provide an interface to a closed-circuit television video feed equipped with a digital video recorder to display and capture exception events in order to aid in the inspection of the carrier prior to rescanning.

RFID tags are fitted to multiple permanent and non-permanent locations on the carrier vehicle and transmit a unique number which is read by an RFID scanner. The permanent locations include the cab and the trailer of the carrier itself for identification and tracking purposes. Additional non-permanent locations include the loading and unloading hatches and the various fittings around the trailer including maintenance ports and clean out valves. The number of RFID locations varies by trailer type and carrier. The RFID tags in the non-permanent locations act as disposable security seals that will fail to respond to the interrogation hardware if removed or tampered with. If an RFID tag does not respond, the current scanning module will indicate an alarm condition noting which seal is not responding.

The use of the multiple RFID tags fitted to multiple permanent and non-permanent locations on the carrier vehicle supported by the CRM, the DSM, and the RSM provides for reduced cargo inspection time and labor at the point of departure and the point of receipt. Reducing the inspection time increases the efficiency of the dispatch and receipt procedures and allows more shipments to be made. By eliminating the human inspection element, inspection errors are reduced and the inspection itself is assured to actually occur. The system further provides assurance to the driver and the originating facility and the receiving facility that the integrity of cargo has not been compromised during shipment. If a breach occurs, the automated, documented trail of secure checks helps to pinpoint when the breach occurred and therefore reduces the liability with regard to the safety and security of the cargo of each company that may have had control of the cargo during shipment.

BRIEF DESCRIPTION OF THE DRAWINGS

FIG. 3 is a computer screen image of the cargo registration module (CRM) of the preferred embodiment of the present invention.

FIG. 4 is a flow diagram of the dispatch security sequence within the preferred embodiment of the present invention.

DETAILED DESCRIPTION OF EXEMPLARY EMBODIMENTS

The present invention is described in this specification in terms of systems and methods for improving the security and integrity in the transport of bulk materials from dispatch to receipt. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention. The invention may also be embodied in a computer program product, such as a diskette, CD, DVD, removable storage device, networked program or other recording medium, for use with any suitable data processing system. Although the exemplary embodiments described in this specification are oriented to software installed and executing automatically on computer hardware, alternative embodiments may be implemented manually by hand or semi-manually by the use of an electronic digital assistant or handheld scanner and are within the scope of the present invention. Within the preferred embodiment of the present invention the programming means is the NET framework operating in a Microsoft Windows operating system on typical business PC-based computer hardware.

Figure 1:
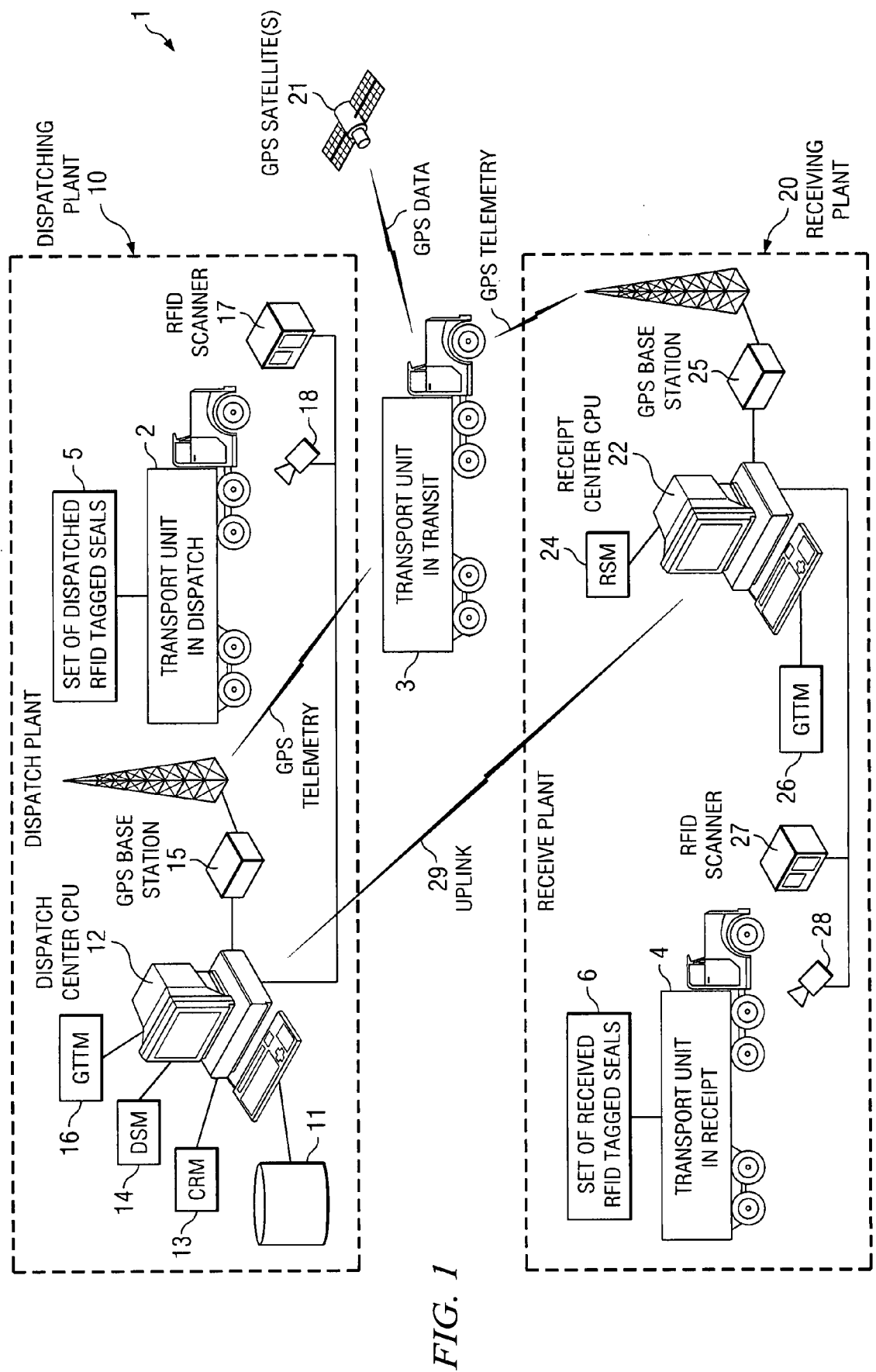
FIG. 1 is a block diagram of a special transport network of the preferred embodiment of the present invention.

In FIG. 1 a special transport network 1 is shown in the form of a block diagram wherein a transport unit is dispatched securely from dispatch plant 10 to receive plant 20, the transport unit transiting some geographical distance to receive plant 20 where it is securely received.

Within the dispatch plant 10 at a given time is the transport unit in dispatch 2 which has a set of dispatched RFID tagged seals 5 attached at various locations and designed to ensure that any cargo contained with the transport unit in dispatch 2 is known and has not been adulterated after the loading and dispatch process. The dispatch plant 10 also has within it a dispatch center CPU 12 for processing data and operating dispatch and transit mapping programs, a GPS base station 15 for gathering GPS telemetry, a dispatch RFID scanner 17 for scanning dispatched RFID tagged seals 5 and a dispatch CCTV 18 with digital video recorder capability for capturing and recording video images of the transport unit in dispatch 2. CCTV 18 is used to investigate dispatch security exceptions which occur when the dispatch RFID scanner 17 fails to read any of the set of dispatch RFID tagged seals 5. Transport unit in dispatch 2 will have a vehicle and operator assigned to it.

Dispatch center CPU 12 operates a set of software programs, the essential software programs for the purposes of the present invention being a cargo registration module, CRM 13 for data entry of cargo related information and dispatch information; a dispatch scanning module, DSM 14, to scan with dispatch RFID scanner 17 and to dispatch or not to dispatch a transport unit based on the results of said scan; a GPS transit tracking module, GTTM 16, for tracking the progress of transport unit in dispatch 2; a database 11 which is attached to dispatch center CPU 12 and used by CRM 13 for storing data related to the transport units.

Transport unit in dispatch 2 becomes transport unit in transit 3 upon successful dispatch from dispatch plant 10. Successful dispatch means that transport unit in dispatch 2 has the associated vehicle, its operator and all of its set of dispatch RFID tagged seals 5 physically in place and verified. While in transit, transport unit in transit 3 interacts with GPS satellite 21 to determine its location. Transport unit in transit 3 transmits location data via wireless network connectivity to the GPS base stations in dispatch plant 10 and receive plant 20, the base station in dispatch plant 10 being GPS base station 15 and the base station in receive plant 20 being GPS base station 25. Upon reaching receive plant 20 transport unit in transit 3 is received in to receive plant 20 as transport unit in receipt 4.

Transport unit in receipt 4 has a set of received RFID tagged seals 6 which may be different than the set of dispatched RFID tagged seals 5 due to the possibility of tampering. The intent of the receiving process is to compare the set of received RFID tagged seals 6 to the set of dispatched RFID tagged seals 5, alerting security systems when a match does not occur or allowing transport unit in receipt 4 entry to automatically enter the receiving plant 20 when a match does occur. Information contained in database 11 relating transport unit in dispatch 2 to transport unit in receipt 4 is communicated to receipt center CPU 22 via a standard communications network 29. In particular, the RFID numbers in the set of dispatched RFID tagged seals 5 are sent from dispatch plant 10 to receive plant 20 and must be matched to the RFID numbers in the set of received RFID tagged seals 6 detected at receive plant 20.

Receive plant 20 has a receipt center CPU 22 for processing data and operating receipt security programs and transit mapping programs, a GPS base station 25 for gathering GPS telemetry, a receipt RFID scanner 27 for scanning received RFID tagged seals 6 and a dispatch CCTV 28 with digital video recorder capability for capturing and recording video images of the transport unit in receipt 4. CCTV 28 is used to investigating receive security exceptions which occur when receive RFID scanner 27 fails to read any of the set of received RFID tagged seals 6.

Receipt center CPU 22 operates a set of software programs, the preferred software programs for the purposes of the present invention being a receipt scanning module, RSM 24, to scan receipt RFID scanner 27 and to receive or not to receive a transport unit based on the results of the scan; and a GPS transit tracking module, GTTM 26, for tracking the progress of transport unit in transit 3.

In the preferred embodiment of the present invention, CCTV cameras and digital video recorders, CCTV 18 and CCTV 28, are realized with the combination of a camera from PELCO corporation of Clovis, Calif., model Spectra III and a video system from Dedicated Micros corporation of Chantilly, Va., model Digital Sprite 2.

Figure 2:
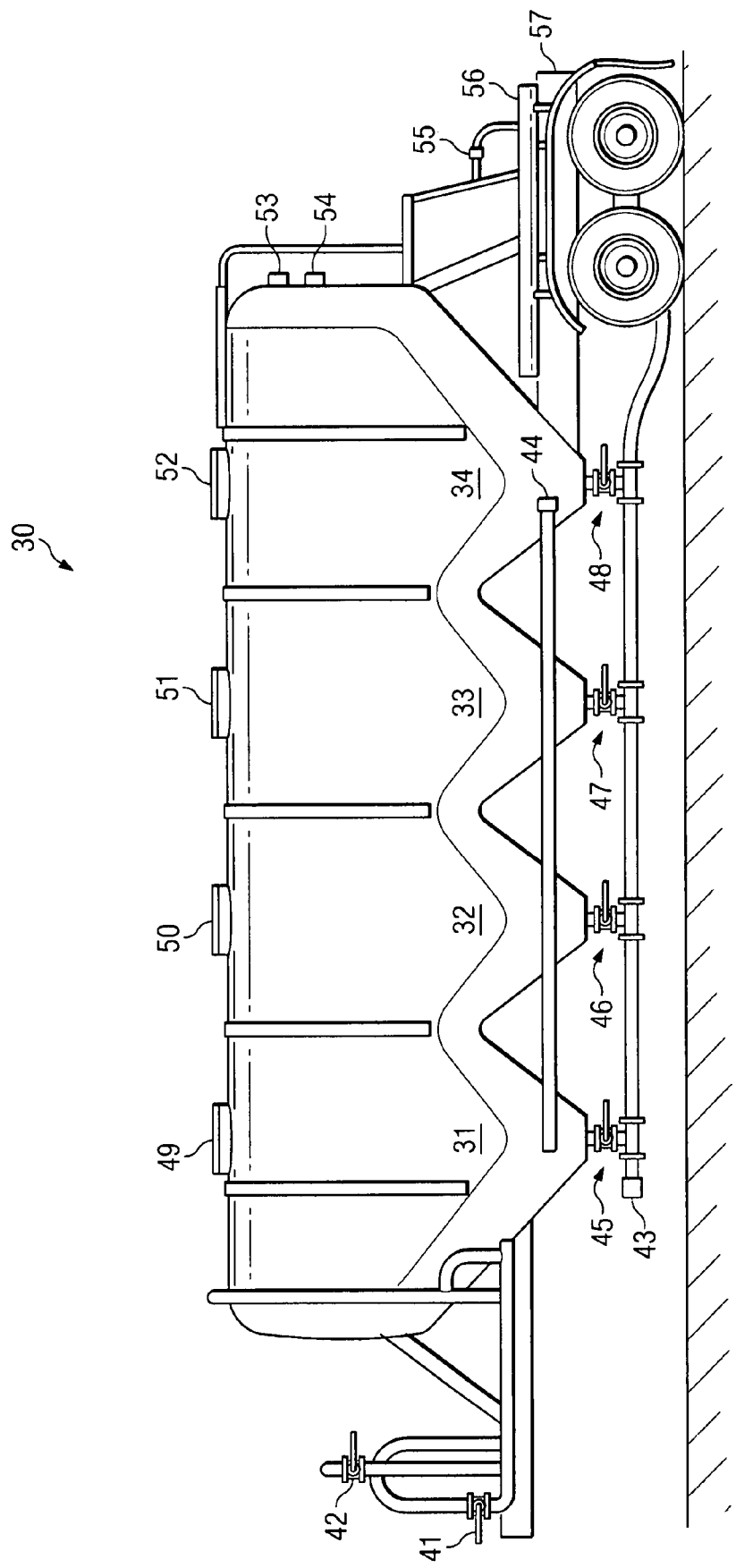
FIG. 2 is a pictorial diagram of a carrier trailer unit showing typical sealing arrangements.

FIG. 2 is a pictorial drawing of a typical cargo carrier in the preferred embodiment of the present invention. Cargo carrier 30 is used to carry bulk dry goods for the baking industry such as flour and has a set of four bins, first bin 31, second bin 32, third bin 33 and fourth bin 34, each bin potentially having a different cargo. Each bin must have at least one seal in order to minimally maintain integrity between dispatch and receipt. Cargo carriers similar to cargo carrier 30 have between 4 (four) RFID tagged seals and 24 (twenty-four) RFID tagged seals. At least one permanent RFID tag is placed on a truck to which the cargo carrier is attached and at least one permanent RFID tag is attached to the cargo carrier. Permanent tags are considered non-destructible in the context of the present invention. Some RFID tagged seals are "semi-permanent" and not being removed each time the carrier is loaded or unloaded. Other seals are temporary and are destroyed each time the cargo carrier 30 is loaded or unloaded. Semi-permanent tags are placed on maintenance ports used to clean out bins. The maintenance ports are typically checked on a schedule but are not checked and cleared after every trip. To show examples of the types of ports that can be sealed or have an RFID attached, a number of RFID tagged seals are shown in FIG. 2. First clean-out valve 41 and second clean-out valve 42 are RFID sealed and semi-permanent being destroyed only on scheduled inspection. Single output port 43 combines the flow out of all four bins and is RFID sealed, the RFID seal being broken upon unloading. Single maintenance port 44 is RFID sealed. First bin 31 has a first set of three seals 45 on output ports, one of which is broken upon unloading, the other two are semi-permanent. Second bin 32 has a second set of three seals 46 on output ports, one of which is broken upon unloading, the other two are semi-permanent. Third bin 33 has a third set of three seals 47 on output ports, one of which is broken upon unloading, the other two are semi-permanent. Fourth bin 34 has a fourth set of three seals 48 on output ports, one of which is broken upon unloading, the other two are semi-permanent. First bin 31 has a first input port seal 49. Second bin 32 has a second input port seal 50. Third bin 33 has a third input port seal 51. Fourth bin 34 has a fourth input port seal 52. Third clean out valve 53 has a semi-permanent RFID seal which is typically destroyed on a maintenance schedule as is fourth clean out valve 54 which also has an RFID seal, fifth clean-out valve 55 which also has an RFID seal and sixth clean-out valve 56 which also has an RFID seal. Finally, cargo carrier 30 has a permanent RFID tag 57 attached so as to identify the cargo carrier as it passes through the dispatch or receipt scan.

CRM 13 is a software module consisting of a database interface with data entry forms that allow an originator at dispatch plant 10 to build a transport unit (describing for example, a truck, cargo carrier, or rail car), a transport unit being a database record that contains identifying data elements such as those shown in TABLE 1.

TABLE 1

Data elements provided by CRM

| Data Element | Description |
| --- | --- |
| RFID tag numbers | Identify the RFID tags affixed to the various openings on a transport unit |
| Transport Carrier ID | Identifies specific vehicle or carrier |
| Cargo ID | Identifies the cargo loaded into each bin |
| Operator ID | Identifies the operator (driver) of the transport unit |
| Inspector ID | Identifies the responsible transport inspector |
| Dispatcher ID | Identifies the responsible dispatcher |
| Dispatch Date and Time | Identifies the date and time of successful dispatch |
| Dispatched From | Identifies the originating plant or mill |
| Dispatched To | Identifies the receiving plant or mill |

Referring again to FIG. 1, the data elements of Table 1 are entered on site using CRM 13 software. Some data elements, such as the RFID tag numbers may be automatically scanned into the CRM 13 system. Other data elements may be entered by a person such as the dispatcher. The data elements are stored in database 11.

RFID tag numbers identify the RFID tags affixed to openings on a transport unit. The RFID tags will transmit a unique number when interrogated by an RFID scanner device. These numbers are then matched to the carrier bins or other features of the transport unit. All of the RFID tags in the preferred embodiment of the present invention are tamper-proof and disposable, in that they will fail to transmit their ID numbers if removed. The RFID tags are disposable in the sense that they are constructed of plastic materials. When the RFID tags are removed from the vehicle, they are destroyed such that they are no longer usable. The RFID devices used in the RFID tagged seals in the preferred embodiment of the present invention are the Alien Squiggle Family of EPC Gen 2 RFID tags from Alien Technology of Morgan Hill, Calif. Further description of the structure of the seals will be provided.

In the preferred embodiment of the present invention, the RFID scanners, dispatch RFID scanner 17 and receipt RFID scanner 27, are manufactured by Alien Technology, model number ALR 9800 Enterprise RFID reader Transport carrier ID identifies the vehicle in which the cargo with Cargo ID is loaded and to which the RFID tagged seals are affixed. Cargo ID identifies the specific type of cargo. Operator ID identifies the operator of the vehicle associated with the transport carrier ID.

The vehicle with transport carrier ID must be inspected before dispatch. The inspection may be a local physical inspection or it may be a remote inspection via CCTV and RFID scanner. The person responsible for the inspection is identified with Inspector ID. Once the vehicle with transport carrier ID clears inspection it is ready for dispatch. A dispatcher identified with Dispatch ID sets a destination in the Dispatched "To" data element, the Dispatched "From" data element is the location of the vehicle at the time of dispatch, the time and date being set in the Dispatch date and time data element.

A screen shot of CRM 13 data entry form 100 is shown in FIG. 3. Data entry form 100 includes a transport unit window 101 which shows the database records of database 11. Each row describes a transport unit and each column contains a set of data elements for the transport units, the data elements being those described in Table 1. When a particular row is highlighted in the transport unit window 101, a corresponding graphical diagram of the vehicle associated with highlighted row is indicated. The graphical diagram includes blocks for each bin. The first bin has a first cargo block 102 indicating the cargo ID and a first tag block 112 indicating the RFID tag number associated with the seal on the first bin; the second bin having second cargo block 104 indicating the cargo ID and a second tag block 114 indicating the RFID tag number associated with the seal on the second bin; the third bin having third cargo block 106 indicating the cargo ID and a third tag block 116 indicating the RFID tag number associated with the seal on the third bin; and the fourth bin having fourth cargo block 108 indicating the cargo ID and a fourth tag block 118 indicating the RFID tag number associated with the seal on the fourth bin. The vehicle is identified in the vehicle block 122 and the operator is identified in the operator block 120. The graphical display of the vehicle provides a convenient mechanism for the dispatcher to quickly assess the dispatch situation.

Below the transport unit window 101 is a set of blocks displaying various other data in the transport unit data record that is highlighted: the dispatch date block 136, the point of origin block 132, the destination block 134, the inspector block 138, and the dispatcher block 140.

A set of database file controls 142 are used to create, edit, save and delete database records in database 11. Dispatch button 144 is used to initiate a dispatch security scan.

FIG. 4 is a flowchart of a dispatch security scan 150 in the context of the preferred embodiment of the present invention. Elements of FIG. 1 are also used in the description of the dispatch security scan 150. The dispatch security scan 150 begins with begin scan step 154 which loads the scanned vehicle transport unit data 152 extracted from database 11 for the transport unit associated with the vehicle to be scanned. Begin scan step 154 then initiates the dispatch scan on the vehicle, deploying the RFID scanner 17 according to FIG. 1. Begin scan step 154 ends by reading a set of scanner RFID numbers from RFID scanner 17 into dispatch computer 12. A successful dispatch scan means that scanned RFID numbers on the scanned vehicle match the RFID numbers that were entered into the scanned vehicle transport unit data by CRM 13. Matching step 156 checks for a successful scan and, if successful, the dispatch security scan 150 moves on to signal step 157, send dispatch data step 158 and display successful dispatch screen step 159. If matching step 156 is not successful then the dispatch security scan 150 moves to exception step 160.

Signal step 157 signals the departure gate attendant to allow the vehicle to pass, or in another embodiment where the departure gate is automatically controlled, signal step 157 opens the departure gate.

Send dispatch data step 158 causes the scanned vehicle transport unit data 152 to be sent from the dispatch center CPU 12 to the receipt center CPU 22 via communications network 29.

Figure 5:
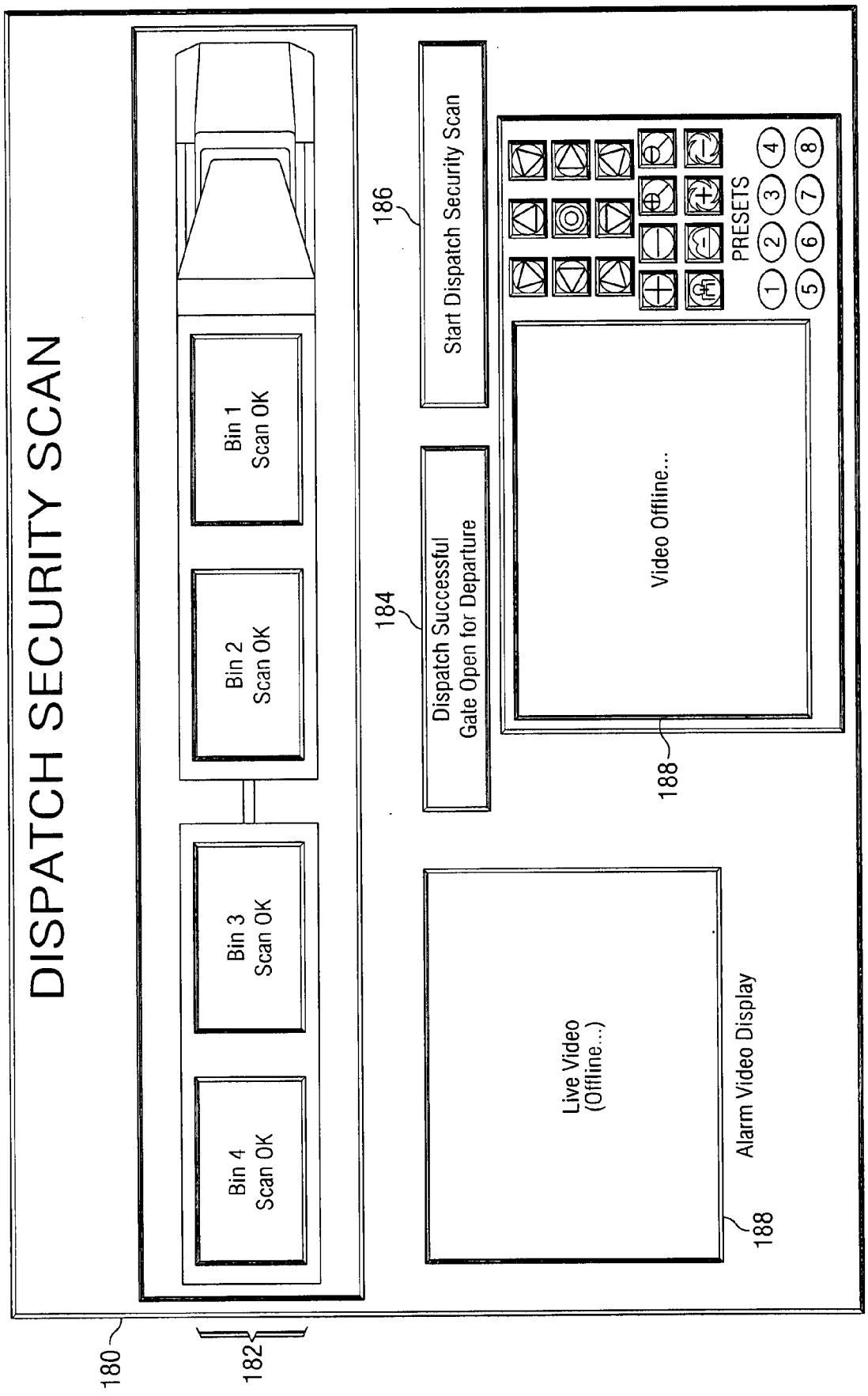
FIG. 5 is a computer screen image of the dispatch scanning module (DSM) of the preferred embodiment of the present invention.

Display successful dispatch screen step 159 displays a screen similar to screen shot 180 of FIG. 5 in the preferred embodiment of the present invention. In screen shot 180 the set of bins 182 are graphically shown to be scanned successfully with "Scan OK" indicated for each bin. If the scans are unsuccessful, a typical display of "scan failed" would appear instead. The status button 184 of signal step 157 is shown as "Dispatch Successful Gate Open for Departure". (A new scan may be initiated with scan button 186. The various video screens 188 and associated controls shown in screen shot 180 are disabled.)

Exception step 160 causes a control signal to be sent to the CCTV camera in CCTV step 162. In CCTV step 162 the CCTV is activated and the resulting video signal is sent back to dispatch center CPU 12 in display exception step 164. The video is stored for archive in video store step 166.

Figure 6:
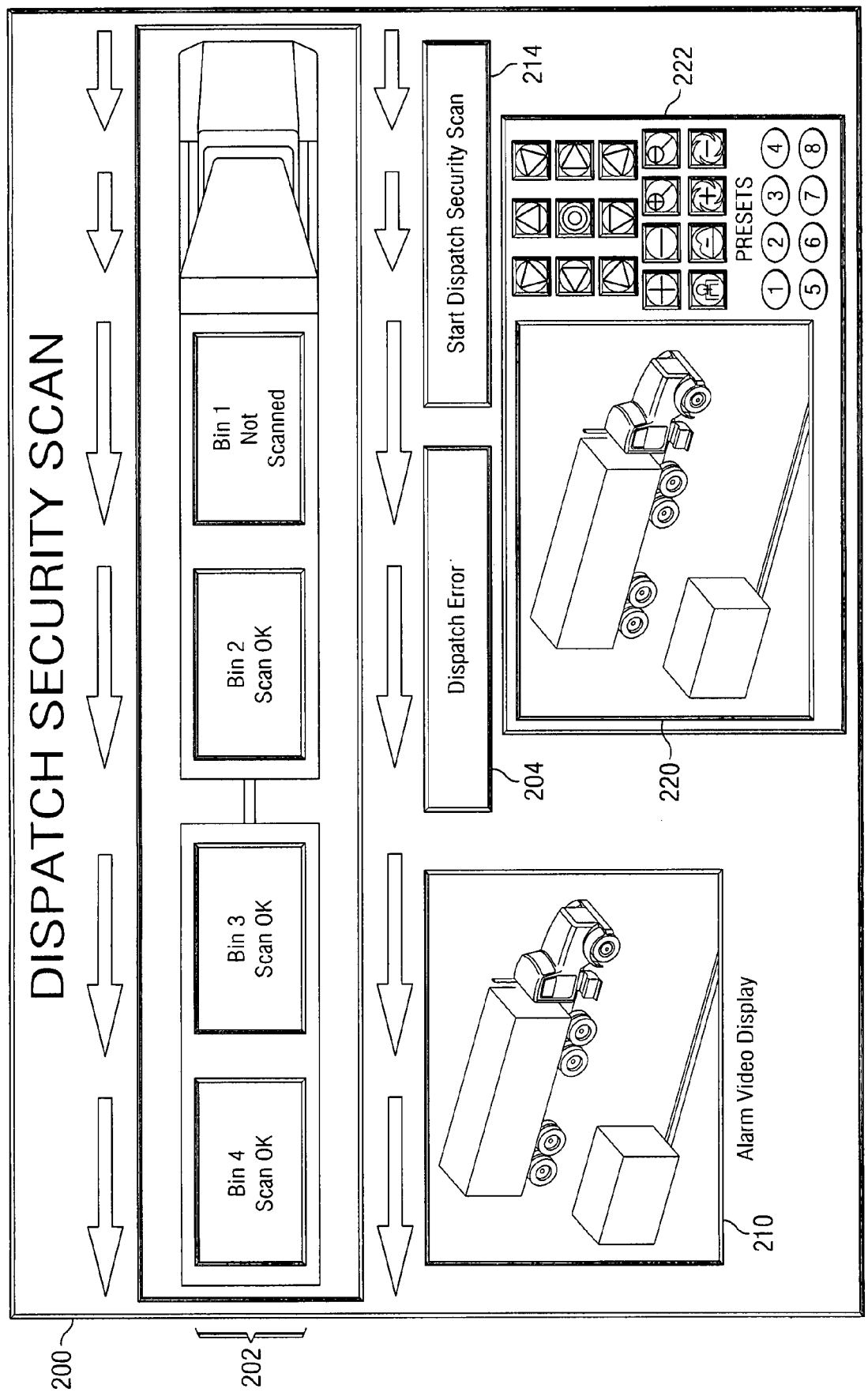
FIG. 6 is a computer screen image of the dispatch scanning module (DSM) of the preferred embodiment of the present invention wherein a dispatch exception has occurred.

Display exception step 164 displays a screen similar to screen shot 200 of FIG. 6 in the preferred embodiment of the present invention. In screen shot 200 the set of bins 202 are graphically shown to be scanned with success or with failure: the successful scans indicated by "Scan OK" and the failed scan indicated by "Not Scanned" with the bin graphically colored red. A status button 204 indicates that the dispatch security scan is in exception state by displaying "Dispatch Error". A new scan may be initiated by selecting the scan button 214. Live video from the CCTV camera is displayed in Alarm Video Display area 210. Stored video from video store step 166 is displayed in Stored Video Display area 220. A set of video controls 222 are available to locate, zoom into, rotate, and preset camera angles to observe views of the vehicle and its features including the RFID tagged seals.

Restart dispatch scan step 163 causes a new scan to be initiated at begin scan step 154 by clicking the scan button 186.

Figure 7:
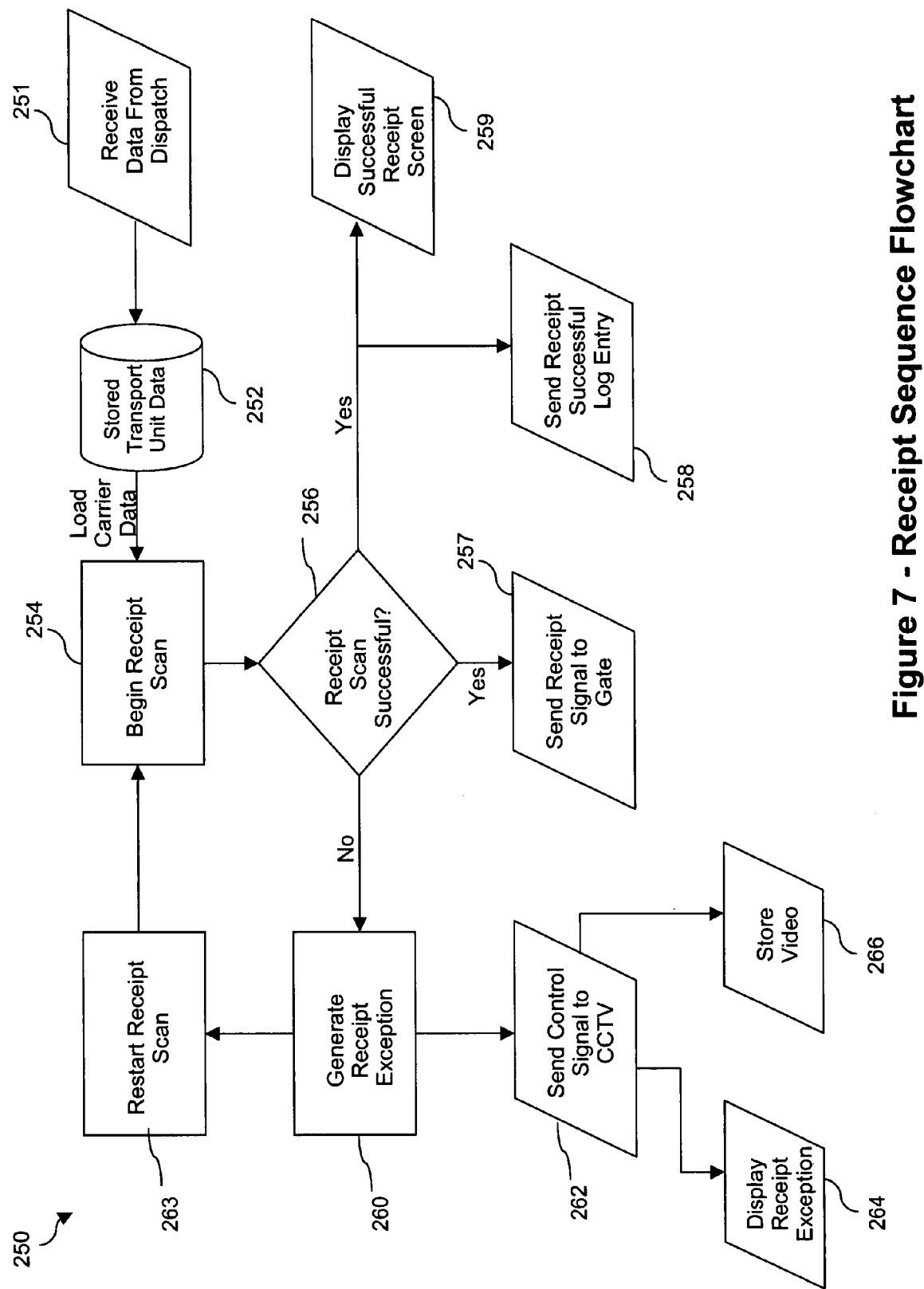
FIG. 7 is a flow diagram of the receipt security sequence within the preferred embodiment of the present invention.

FIG. 7 is a flowchart of a receipt security scan 250 in the context of the preferred embodiment of the present invention. Elements of FIG. 1 are also used in the description of the receipt security scan 250. The receipt security scan 250 begins when a vehicle arrives at the entrance to the receiving plant 20. The arrived vehicle is associated to the transport unit in receipt 4 of FIG. 1. The receipt security scan 250 is initiated by a gate operator which may be automatic. Prior to the vehicle arrival, the receive data step 251 receives transport unit data records from various dispatch plants over communications network 29, one of the data records being associated to the arrived vehicle that is to be scanned. The associated data record 252 is stored locally on the receipt center CPU 22. Upon initiation of the receipt scan, begin scan step 254 loads the associated data record 252. Begin scan step 254 then initiates the receipt scan on the vehicle, deploying RFID scanner 27 according to FIG. 1. Begin scan step 254 ends by reading a set of scanned RFID numbers from RFID scanner 27 into receipt computer 22. A successful receipt scan means that scanned RFID numbers on the scanned vehicle match the RFID numbers that were entered into the associated data record 252. Matching step 256 checks for a successful scan and, if successful, receipt security scan 250 moves on to signal step 257, send receipt data step 258 and display successful receipt screen step 259. If matching step 256 is not successful, then dispatch security scan 250 moves to exception step 260.

Signal step 257 signals the receiving gate attendant to allow the vehicle to physically pass into receiving plant 20 or in another embodiment where the receiving gate is automatically controlled, the signal step 257 opens the receiving gate.

Send receipt data step 258 causes a "successful receipt" message to be sent from the receiving center CPU 22 to the dispatch center CPU 12 via communications network 29. The dispatch center CPU 12, in turn, logs the "successful receipt" information into the data record associated with the transport unit in receipt 4 contained in database 11 as transport unit in dispatch 2.

Figure 8:
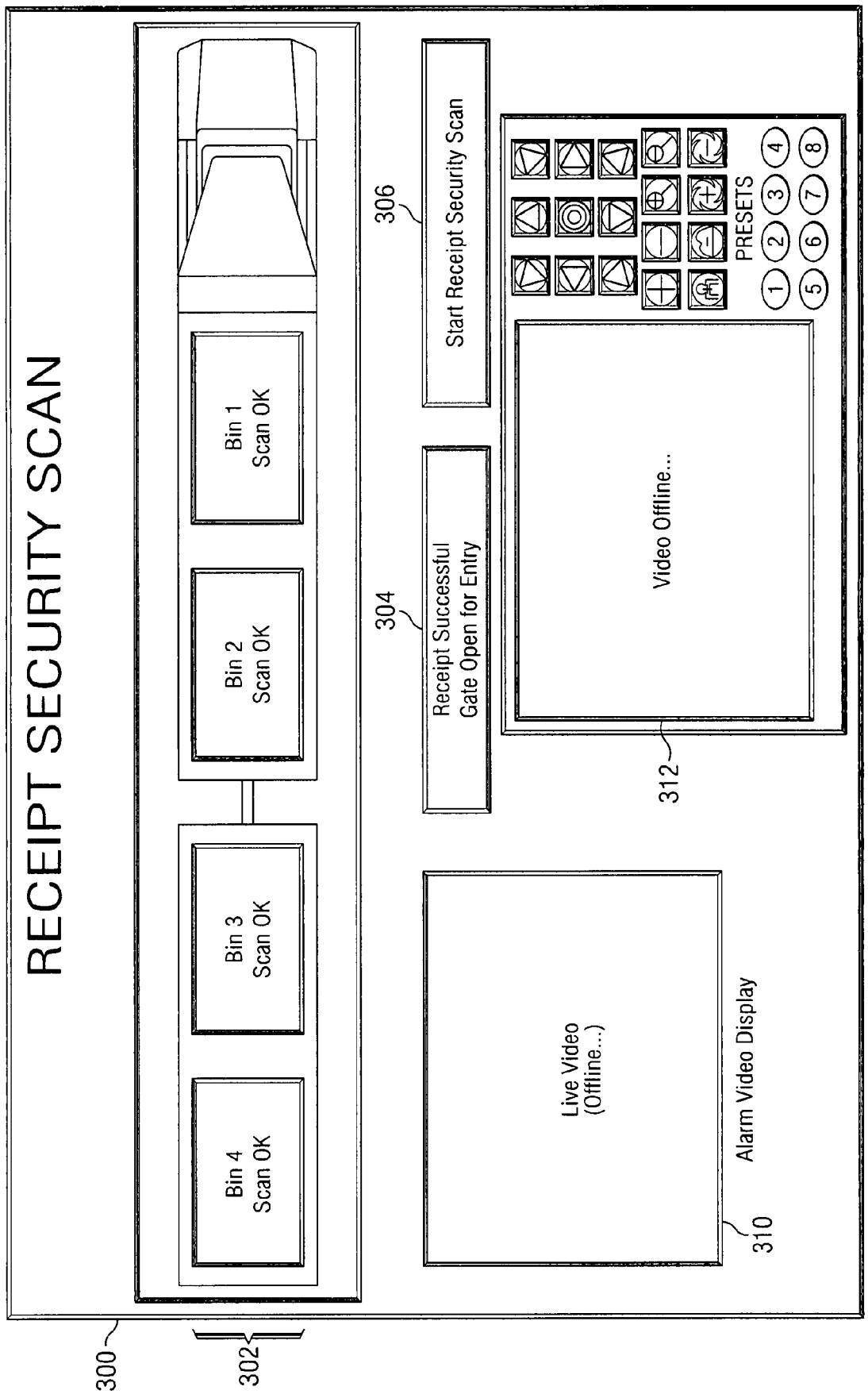
FIG. 8 is a computer screen image of the receipt scanning module (RSM) of the preferred embodiment of the present invention.

Display successful receipt screen step 259 displays a screen similar to screen shot 300 of FIG. 8 in the preferred embodiment of the present invention. In screen shot 300 the set of bins 302 are graphically shown to be scanned successfully with "Scan OK" indicated for each bin. If the scans are unsuccessful a typical display of "scan failed" would appear instead. The status button 304 of signal step 257 is shown as "Receipt Successful Gate Open for Entry". A new scan may be initiated with scan button 306. The live video screens 310 and archived video screen 312 with associated controls shown in screen shot 300 are disabled.

Exception step 260 causes a control signal to be sent to the CCTV camera in CCTV step 262. In CCTV step 262 the CCTV is activated and the resulting video signal is sent to receipt center CPU 22 in display receipt exception step 264. The video is stored for archive in video store step 266.

Figure 9:
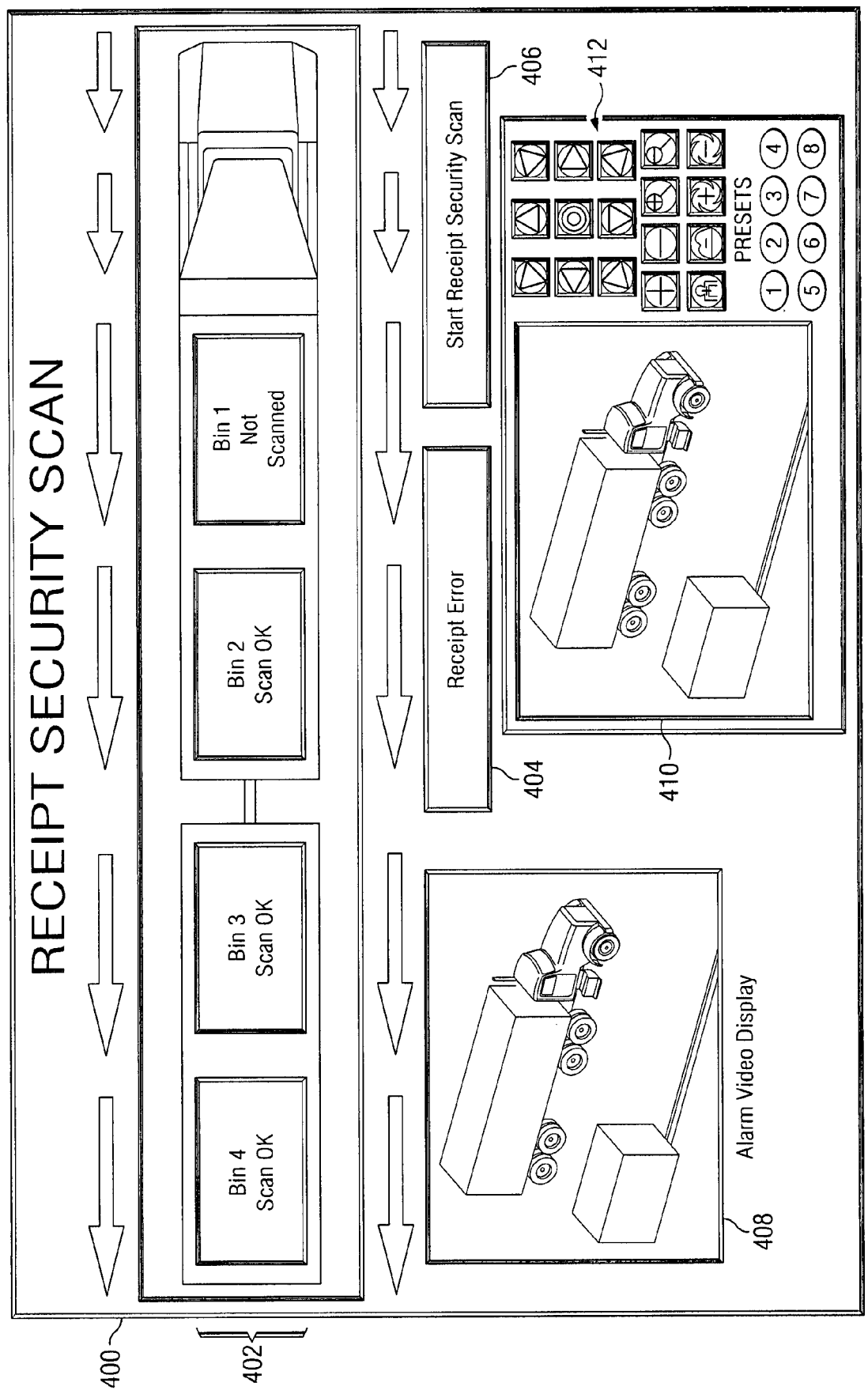
FIG. 9 is a computer screen image of the receipt scanning module (RSM) of the preferred embodiment of the present invention wherein a receipt exception has occurred.

Display receipt exception step 264 displays a screen similar to screen shot 400 of FIG. 9 in the preferred embodiment of the present invention. In screen shot 400 the set of bins 402 are graphically shown to be scanned with success or with failure: the successful scans indicated by "Scan OK" and the failed scan indicated by "Not Scanned" with the bin graphically colored red. A status button 404 indicates that the receipt security scan is in exception state by displaying "Receipt Error". A new scan may be initiated by selecting the scan button 406. Live video from the CCTV camera is displayed in Alarm Video Display area 408. Stored video from video store step 266 is displayed in Stored Video Display area 410. A set of video controls 412 are available to locate, zoom into, rotate, and preset camera angles to observe views of the vehicle and its features including the RFID tagged seals.

Restart receipt scan stop 263 causes a new scan to be initiated as a begin scan step 254 by clicking the scan button 306.

Figure 10:
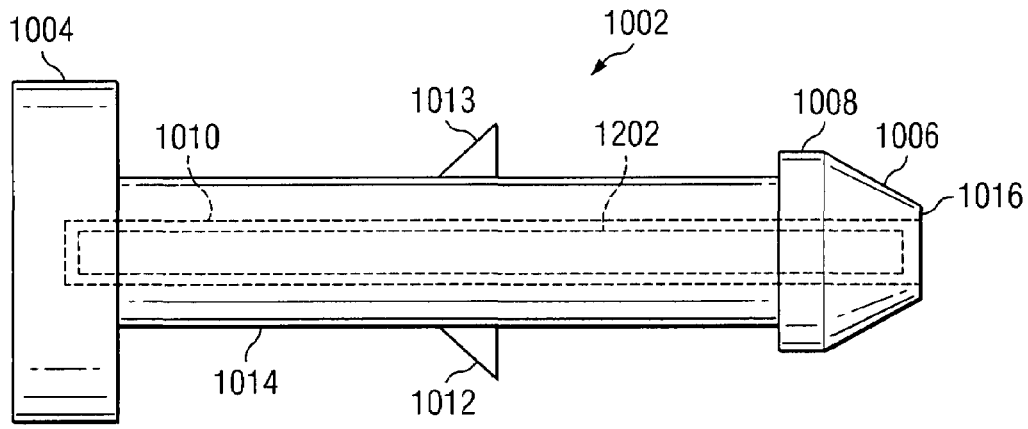
FIG. 10 is a plan view of the bolt portion of a seal of a preferred embodiment of the present invention.

FIG. 10 shows bolt portion 1002 of a seal used to protect the integrity of the cargo. Bolt portion 1002 is generally an integrally formed shaft 1014 with head 1006 on one end and bolt base 1004 on the opposite end. In the preferred embodiment, bolt portion 1002 is approximately 5 inches in length. Cylindrically shaped shaft 1014 extends between head 1006 and bolt base 1004 and is approximately ¾ inch in diameter. Bolt base 1004 is cylindrical in shape and has a diameter greater than the diameter of shaft 1014. Head 1006 is conical in shape and includes a cylindrical flange 1008. Flange 1008 has a diameter greater than the diameter of shaft 1014. Face 1016 is approximately perpendicular to the central axis of bolt portion 1002 and includes tag chamber 1010. Tag chamber 1010 comprises is hole along the longitudinal axis of bolt portion 1002. Tag chamber 1010 runs completely through the length of head 1006 and shaft 1014 and approximately halfway through the length of bolt base 1004. In the preferred embodiment, the diameter of tag chamber 1010 is approximately ½ inch and accommodates a disposable RFID tag. Stops 1012 and 1013 are protrusions located on shaft 1014 and prevent the nut from moving on shaft 1014.

In the preferred embodiment, RFID tag 1202 is a Gen 2 Squiggle manufactured by Alien Technology Corporation (www.alientechnology.com). Tag 1202 resides in tag chamber 1010 and is held in place by a suitable non-metallic epoxy. Tag chamber 1010 is filled with a polyurethane adhesive or foam adhesive such as from the VORAMER family of products manufactured by Dow Chemical Company of Midland, Mich. (www.dow.com) to securely embed RFID tag 1202. Once the seal is completely assembled, the ends of RFID tag 1202 will be within approximately ¼ inch of the ends of bolt portion 1002.

Figure 11:
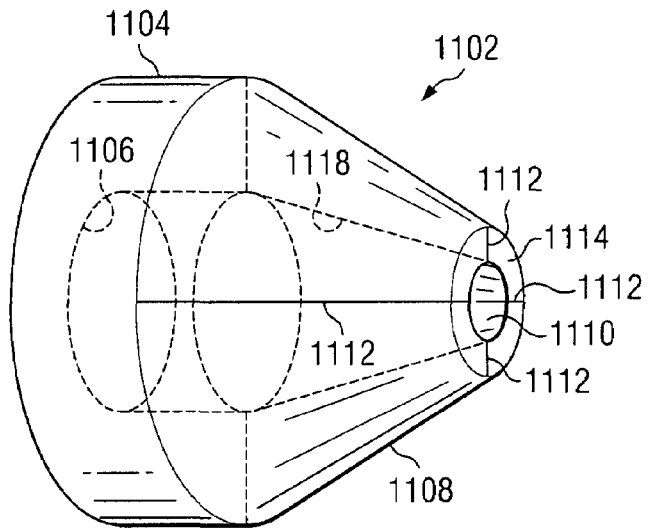
FIG. 11 is an isometric view of the expansion nut portion of a preferred embodiment of the present invention.

FIG. 11 shows nut portion 1102. In the preferred embodiment, bolt portion 1002 and nut portion 1102 are both formed of durable and flexible plastic such as Teflon or nylon manufactured by DuPont of Wilmington, Del. (www.dupont.com). Nut portion 1102 includes cylindrically shaped nut base 1104 integrally formed with a top 1108. Nut base 1104 defines concentrically aligned and hole 1106. Nut base 1104 has approximately the same outer diameter as bolt base 1004 while hole 1106 has a slightly larger diameter than flange 1008. Top 1108 is a generally frustroconical shape having face 1114. Top 1108 includes a conical shaped hollow interior shown as center hole 1118. Abutment face 1114 is approximately perpendicular to the central axis of top 1108 and defines a circular opening shown as top hole 1110. Hole 1106 passes through nut base 1104 and leads to center hole 1118 which leads to top hole 1110. Top 1108 further includes four expansion slots 1112. In other embodiments, a greater or lesser number of expansion slots may be provided depending on engineering choice.

Figure 12:
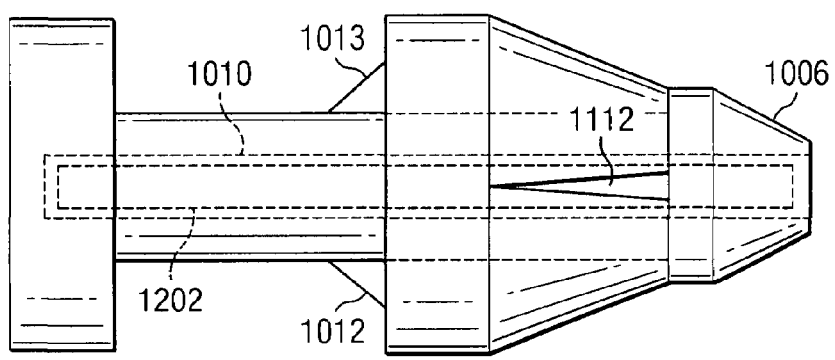
FIG. 12 is a plan view of an assembled seal of a preferred embodiment of the present invention.

FIG. 12 shows nut portion 1102 engaged with bolt portion 1002. Nut portion 1102 slides over head 1006 and past flange 1008 until nut portion 1102 abuts stops 1012 and 1013. The close proximity to the ends of the seal prevent the seal from being cut, damaged, or removed without breaking RFID tag 1202.

Figure 13:
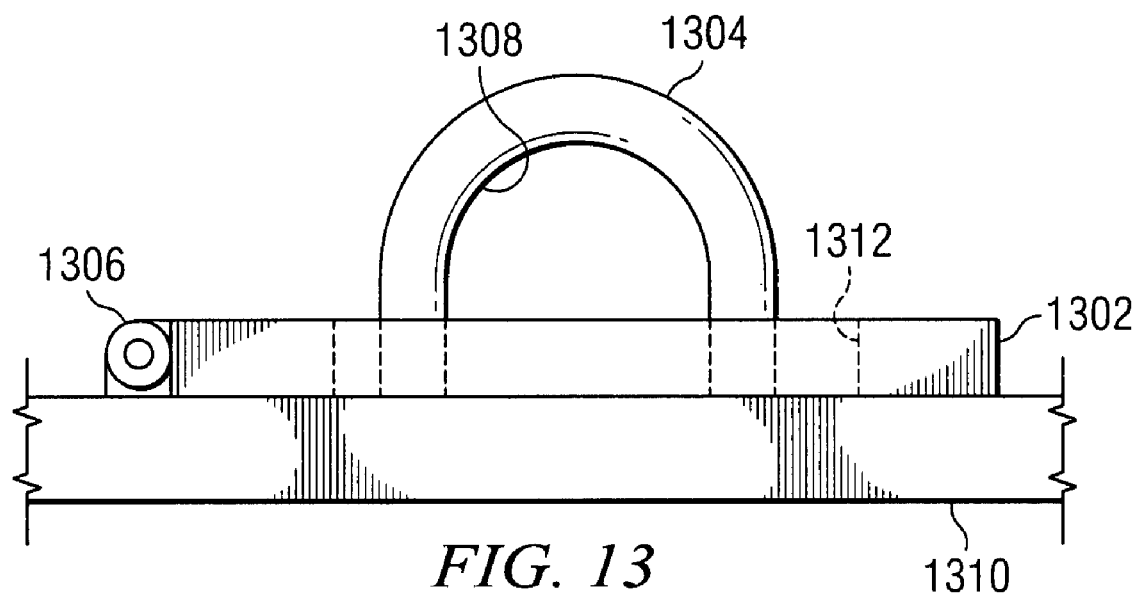
FIG. 13 is a side view of a closing mechanism of a typical transport carrier as known in the art.
Figure 14:
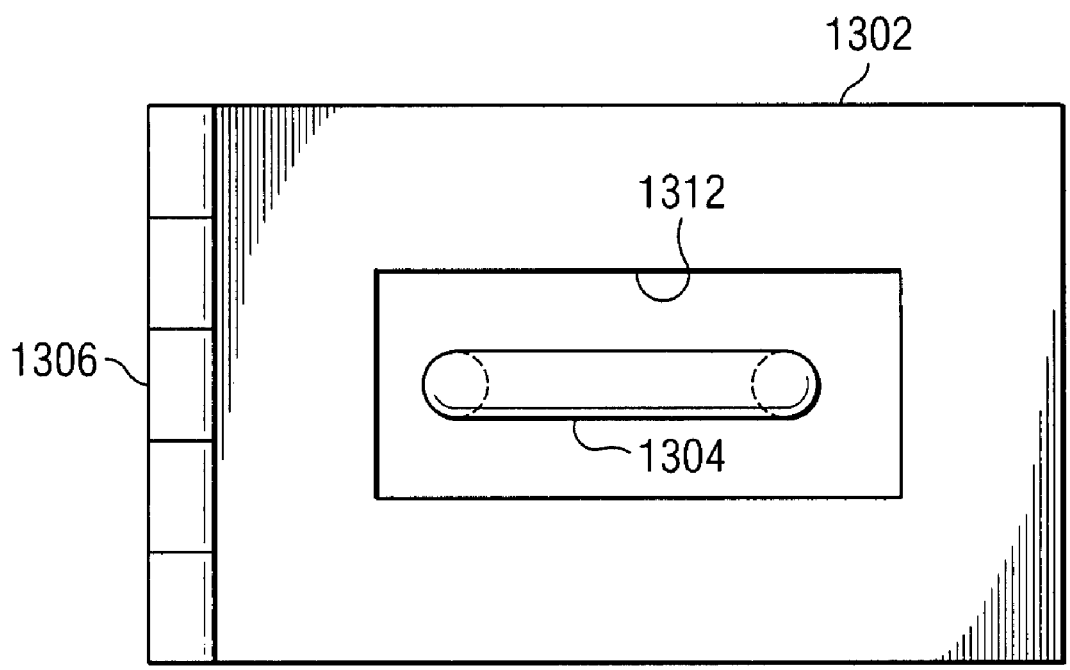
FIG. 14 is a front view of a closing mechanism of a typical transport carrier as known in the art.

FIGS. 13 and 14 illustrate a typical closing mechanism providing a location for a one-time use seal that includes an embedded disposable RFID tag. As can be seen in FIGS. 13 and 14, the typical closing mechanism comprises clasp 1302 rotatably connected to carrier 1310 via hinge 1306. Clasp 1302 defines clasp slot 1312. Clasp slot 1312 is a generally rectangular shaped opening with proportions capable of allowing loop 1304 to pass through. Loop 1304 is rigidly connected to carrier 1310 and defines eyelet 1308. In the preferred embodiment, loop 1304 is semicircular in shape but could also be rectangular, square, or oval.

In practice, to secure the integrity of the bulk cargo in a particular bin, an assembled seal as shown in FIG. 12 is secured in loop 1304. To access the cargo in the bin, the shaft of the bolt must be cut to be removed, thus destroying the embedded RFID tag. Once destroyed, the RFID tag will not respond to an interrogator and thus an alert will be shown during a dispatch or receipt scan.

Once the bin is loaded with product, clasp 1302 is rotated until it becomes adjacent to carrier 1310. Loop 1304 extends through clasp slot 1312. Bolt portion 1002 is inserted through eyelet 1308 while bolt base 1004 prevents bolt portion 1002 from passing completely through. Nut portion 1102 slides over head 1006 and past flange 1008. Expansion slots 1112 allow top 1108 to expand enough to permit head 1006 to pass through top 1108 and out of top hole 1110. The conical shape of head 1006 and center hole 1118 facilitate the assembly. The elastic nature of the Teflon material allows nut portion 1102 to deform through the expansion of expansion slots 1112 which permits head 1006 to pass through top 1108. Top 1108 subsequently returns to shape after flange 1008 passes through top hole 1110, hence locking the nut portion onto the bolt. Once nut portion 1102 is securely and irreversibly attached to bolt portion 1002, the port is "sealed" and transport may begin. The cargo in the bin now cannot be accessed without breaking the seal and destroying the embedded RFID tag.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A system for tracking a cargo in a trailer comprising:
   a dispatch computer, in operative connection with a database, attached to a network;
   the dispatch computer operatively connected to a first RFID scanner and to a set of dispatch video cameras;
   the set of dispatch cameras further connected to a first video recorder controlled by the dispatch computer;
   a receipt computer, attached to the network;
   the receipt computer operatively connected to a second RFID scanner and to a set of receipt video cameras;
   the set of receipt video cameras operatively connected to a second video recorder controlled by the receipt computer;
   a set of temporary RFID tags, each having a first set of unique identifiers, connected to the trailer;
   a set of semi-permanent RFID tags, each having a second set of unique identifiers, connected to the trailer;
   the dispatch computer further comprising a cargo registration module for receiving and recording the first set of unique identifiers and the second set of unique identifiers in the database and for receiving and recording a dataset related to the cargo;
   the dispatch computer further comprising a dispatch scan module for activating the first RFID scanner to read a first status condition of the set of temporary RFID tags and the set of semi-permanent RFID tags and to store a first status dataset related to the first status condition;
   the receipt computer further comprising a receipt security module for activating the second RFID scanner to read a second status condition of the set of temporary RFID tags and the set of semi-permanent RFID tags; and, comparing the second status condition with the first status condition to determine a match condition.

2. The system of claim 1 wherein the first status condition triggers the dispatch computer to activate the set of dispatch cameras to record an image of the trailer on the first video recorder.

3. The system of claim 1 wherein the second status condition triggers the receipt computer to activate the set of receipt cameras to record an image of the trailer on the second video recorder.

4. The system of claim 1 further comprising:
   a departure gate operatively connected to the dispatch computer; and,
   wherein the first status condition triggers the dispatch computer to activate the departure gate.

5. The system of claim 1 further comprising:
   a receipt gate operatively connected to the receipt computer; and,
   wherein the second status condition triggers the receipt computer to activate the receipt gate.

6. The system of claim 1 wherein the trailer is connected to a truck and wherein the dataset further comprises one or more of the group of:
   A transport carrier ID, a cargo ID an operator ID, an inspector ID, a dispatcher ID, a dispatch date and time, a dispatch location, and a dispatch destination.

7. The system of claim 1 wherein the set of temporary RFID tags include at least one seal;
   the seal comprising a cylindrical bolt having a bolt head and a base flange;
   the cylindrical bolt further comprising an embedded RFID unit integrally affixed within the bolt head;
   the seal further comprising a sealing nut adjacent the base flange and surrounding the cylindrical bolt; and
   the sealing nut further comprising a bias means for preventing removal of the sealing nut from the cylindrical bolt.

8. The system of claim 7 wherein the seal is non-metallic and wherein the RFID unit is affixed within the cylindrical bolt with a non-metallic epoxy.

9. The system of claim 7 wherein the bias means further comprises a set of frustroconical locking arms resiliently attached to a cylindrical collar; and,
   the set of frustroconical locking arms non-releasably abuts the flange.

10. The system of claim 1 further comprising:
    a first GPS base station operatively connected to the dispatch computer;
    a second GPS base station operatively connected to the receipt computer; and
    a GPS transceiver fixed on the trailer for locating the trailer during transit and communicating the location to the first GPS base station and the second GPS base station.

11. A method of tracking a cargo in a container attached to a vehicle where the container further comprises a discrete bin where the bin includes an entrance port, an exit port and a cleaning port, the method comprising:
    placing a first permanent RFID seal having a first ID on the vehicle;
    placing a second permanent RFID seal having a second ID on the container;
    placing a first semi-permanent RFID seal having a third ID on the cleaning port;

placing a first temporary RFID seal having a fourth ID on the entrance port;

placing a second temporary RFID seal having a fifth ID on the exit port;

entering a first dataset into a database, the dataset comprising the first ID, the second ID, the third ID, the fourth ID and the fifth ID;

performing a first remote RFID scan of the first permanent RFID seal, the second permanent RFID seal, the first semi-permanent RFID seal, the first temporary RFID seal and the second temporary RFID seal to derive a second dataset;

storing the second dataset in a database;

comparing the first dataset to the second dataset;

recording a first recorded video image of the container and of the vehicle if the second dataset does not match the first dataset;

dispatching the container and the vehicle if the second dataset matches the first dataset;

transmitting the second dataset to a receiving station;

performing a second remote RFID scan of the first permanent RFID seal, the second permanent RFID seal, the first semi-permanent RFID seal, the first temporary RFID seal and the second temporary RFID seal to derive a third dataset;

storing the third dataset;

comparing the second dataset to the third dataset;

recording a second recorded video image of the container and of the vehicle if the third dataset does not match the second dataset;

admitting the container and the vehicle into a receiving station if the third dataset matches the second dataset.

12. The method of claim 11 further comprising:

storing a notification in the database upon admitting the container and the vehicle into the receiving station.

13. The method of claim 12 further comprising:

destroying the first semi-permanent RFID seal upon removal from the container according to a first delay schedule;

destroying the second semi-permanent RFID seal upon removal from the container according to a second delay schedule;

destroying the first temporary RFID seal upon removal from the container upon admittance to the receiving station; and, destroying the second temporary RFID seal upon removal from the container upon admittance to the receiving station.

14. The method of claim 12 wherein entering a first dataset includes entering one or more of the group of transport carrier ID, cargo ID, operator ID, inspector ID, dispatcher ID, dispatcher date and time, dispatch location and receipt location in the database.

15. The method of claim 11 further comprising:

providing the first temporary RFID seal having a plastic cylindrical bolt integrally containing an RFID transceiver;

providing a deformable plastic nut for non-releasably securing the plastic cylinder; and, sealing the entrance port comprising the step of securing the plastic cylindrical bolt to the deformable plastic nut.

16. The method of claim 11 further comprising monitoring a geographic location of the container by GPS locator.

17. The method of claim 11 further comprising repeating the step of performing a first remote RFID scan if the second dataset does not match the first dataset.

18. The method of claim 11 further comprising repeating the step of performing a second remote RFID scan if the third dataset does not match the second dataset.

19. The method of claim 11 wherein dispatching the container includes sending a first signal to a gate.

20. The method of claim 11 wherein admitting the container includes destroying the second temporary RFID seal.

21. The method of claim 11 further comprising displaying a first live video image of the container before departure and the first recorded video image of the container simultaneously on a display.

22. The method of claim 21 further comprising displaying a second live video image of the container after departure and the second recorded video image of the container simultaneously on a display.

23. The method of claim 11 further comprising storing a dispatch message in the database upon dispatch.

24. A method for securely transporting a cargo with a truck and a trailer comprising:

identifying a cargo type in a bin in the trailer and storing the cargo type in a database;

sealing an opening in the bin with a destructible electronic seal having a first ID and storing the first ID in the database;

polling the destructible electronic seal at a departure location and remotely recording second ID transmitted by the destrubtible electronic seal;

comparing the first ID with the second ID;

if the first ID does not match the second ID, then detaining the trailer in the departure location, activating a first live video feed, recording a first recorded video image of the destructible electronic seal and storing a departure aborted event in the database;

if the first ID matches the second ID, then releasing the trailer from the departure location and storing a departure occurred event in the database;

transporting the cargo to a receiving quarantine location;

transmitting the second ID to the receiving quarantine location;

polling the destructible electronic seal at the receiving quarantine location and remotely recording a third ID transmitted by the destrubtable electronic seal;

comparing the second ID to the third ID;

if the second ID does not match the third ID, then detaining the trailer in the receiving quarantine location, activating a second live video feed, recording a second recorded video image of the destructible electronic seal and storing a receive failure event in the database; and, if the second ID matches the first ID, then releasing the trailer from the receive quarantine location and storing a receive occurred event in the database.

25. The method of claim 24 further comprising:

simultaneously displaying the first live video feed and the first recorded video signal on a first video display; and, simultaneously displaying the second live video feed and the second recorded video signal on a second video display.

26. The method of claim 24 further comprising:

providing a destructible electronic seal comprising a bolt section integrated with an RFID tag and a non-removable nut section; and, sealing the opening by joining the bolt section with the non-removable nut section.

27. The method of claim 24 further comprising:

identifying a plurality of cargo types in a plurality of bins in the trailer and storing each of the plurality cargo types in the database;

sealing an opening from each of the plurality with a set of destructible electronic seals wherein each of the set of destructible electronic seals has a unique ID; and, storing each unique ID in the database.

28. The method of claim 24 further comprising:
associating a first non-destructible RFID tag with the truck having a forth ID;
associating a second non-destructible RFID tag with the trailer having a fifth ID; and,
recording the fourth ID and the fifth ID in the database.

29. The method of claim 28 further comprising:
transmitting the fourth ID and the fifth ID to the receipt quarantine location;
polling the first non-destructible RFID tag and the second non-destructible RFID tag to receive a sixth ID and a seventh ID;
comparing the sixth ID to the fourth ID;
comparing the fifth ID to the seventh ID; and,
recording the results of the comparison in the database.

30. The method of claim 24 further comprising:
tracking the transportation of the cargo with a GPS signal.

* * * * *